DEAN M. PETERSON
INVENTOR.

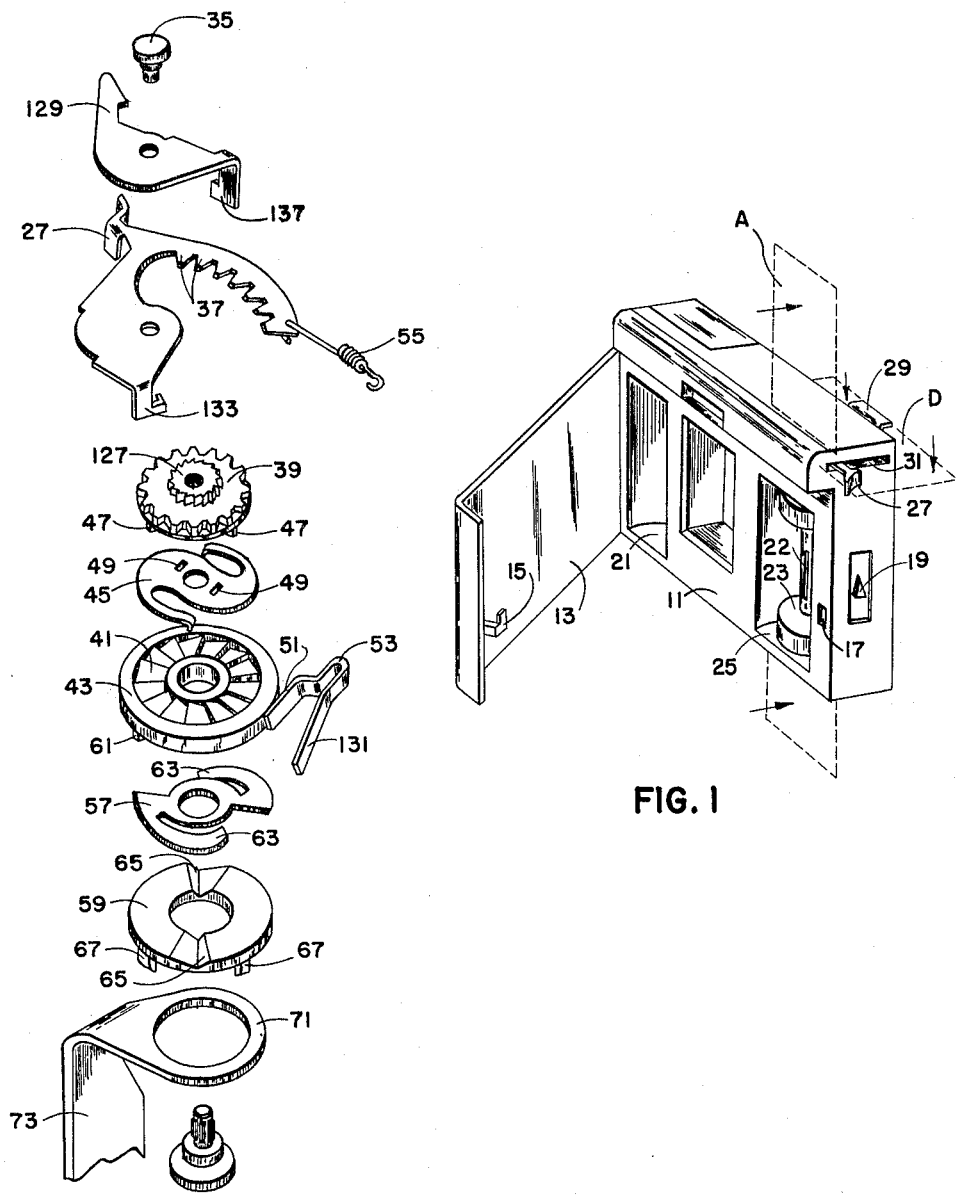

ATTORNEYS

3,106,142
FILM WINDING MECHANISM
Dean M. Peterson, Rochester, N.Y., assignor to Eastman Kodak Company, Rochester, N.Y., a corporation of New Jersey
Filed Aug. 20, 1962, Ser. No. 217,863
3 Claims. (Cl. 95—31)

The present invention relates to film-winding mechanisms, and, more particularly, to such mechanisms incorporated into inexpensive cameras whereby the cocking of the camera shutter is assured whenever the film is advanced following exposure, and whereby the camera's film-winding mechanism and the film take-up spool are mutually engaged and disengaged, respectively, by the locking and opening of the camera cover.

In most roll-film cameras in which the film is wound onto a removable take-up spool, including cameras in which the spool is housed in a removable magazine or cassette, the take-up spool is rotated by a coupling member which is driven by the film-winding mechanism, the coupling member being axially received by a co-operating structure on one end of the spool. Since the construction of most roll film cameras requires that the spool be installed in a direction normal to the spool axis, the coupling member must necessarily be axially movable to a retracted position and to a spool-engaging position to enable the camera to be loaded and unloaded. This movement of the coupling member is generally accomplished by manually retracting or depressing the film-winding knob of the camera which imparts the necessary axial movement to the entire film-winding assembly.

In at least one known prior art device, these additional loading operations are eliminated by the automatic retraction of the winding mechanism as the camera cover is opened. But this prior art device still requires the axial movement of the entire winding mechanism including the winding lever or knob. The present invention is a further improvement on this prior art device and provides a flexible link drive which couples the winding lever or knob to the coupling (spool-driving) member. When the camera cover is closed, the film-winding mechanism operates in the conventional manner to advance the roll film following each exposure. However, when the camera cover is opened to load and unload film, the opening of the cover automatically withdraws the coupling member from the film-winding spool, and this movement of the coupling member is completely absorbed by the flexible link drive, thereby allowing the remaining parts of the winding mechanism to remain in their normal positions.

There are known rachet-type winding mechanisms suitable for use in inexpensive cameras which provide interconnected means for cocking the camera shutter. However, in inexpensive cameras provided with rachet-type film drives, several successive rachet movements are generally required to wind the film the necessary amount following each exposure, and these prior art devices do not provide means to automatically assure that the successive winding movements made by the operator will cock the shutter before the film has been sufficiently advanced for the following exposure.

To overcome this undesirable possibility, automatic shutter-cocking control is provided by the invention herein which interconnects an inexpensive locking device with the shutter drive mechanism of the camera to prevent the normal ratchet movement of the winding mechanism until it has been initially moved through a sufficient arc to assure the cocking of the shutter drive mechanism.

It is an object of this invention to provide a new and improved winding mechanism for roll-film cameras.

Another object of the invention is to provide simple and inexpensive means for automatically engaging and disengaging the film-winding mechanism of the camera and the film-winding spool or cassette.

Still another object is to provide a device which will automatically engage or disengage the winding mechanism of the camera and the film-winding spool or cassette without requiring the axial movement of the entire winding mechanism, particularly without requiring the movement of any parts of the winding mechanism which protrude outside of the camera housing.

Yet another object of the invention is to provide a simple and inexpensive means for automatically engaging and disengaging, respectively, the winding mechanism of a camera from the film-winding spool or cassette whenever the camera cover is, respectively, closed and opened.

A further object of the invention is to provide a simple and inexpensive ratchet-type film-winding mechanism which will automatically assure the cocking of the camera's shutter drive mechanism.

These and other important objects of the invention will be readily apparent from the following description and the accompanying drawings in which like reference characters designate corresponding parts throughout the several views, and in which:

FIG. 1 illustrates a roll-film camera incorporating the winding mechanism disclosed herein, showing the camera with its hinged cover open;

FIG. 2 is an exploded view of a portion of the winding mechanism disclosed herein;

Figure 4:
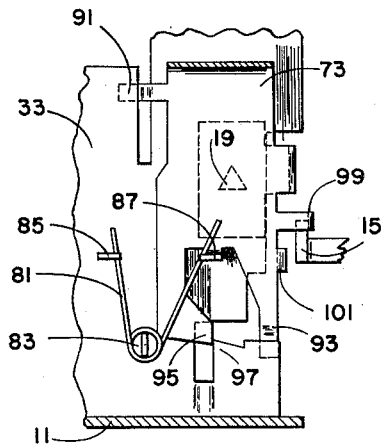
FIG. 4 is a different view of certain parts shown in FIG. 3 taken along the plane B—B' in the direction of the arrows.
Figure 6:
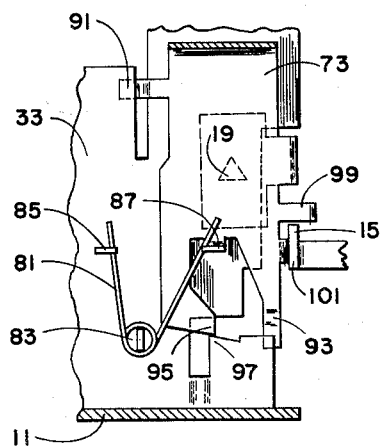
Figure 5:
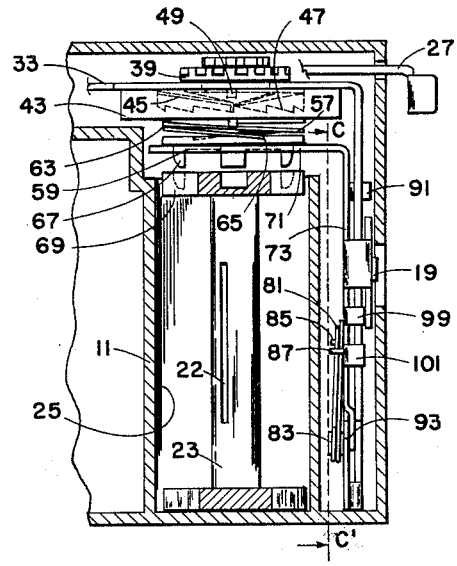
FIG. 5 is a view similar to FIG. 3, showing the relative position of pertinent camera parts when the camera cover is open and the winding mechanism is disengaged from the film-winding spool.

FIG. 6 is a view similar to FIG. 4, showing certain parts illustrated in FIG. 5 and taken along the plane C—C' in the direction of the arrows; and FIGS. 7, 8, 9, and 10 are all partial cross-sections illustrating elevational views of the winding mechanism viewed along the plane D of FIG. 1 in the direction of the arrows, showing the relative positions of the various pertinent camera parts and the winding lever locking mechanism during four successive stages when the winding lever is initially moved following an exposure.

For purposes of general orientation, reference is now made to FIG. 1 which illustrates a roll-film camera having a housing 11 and a spring-biased, hinged cover 13. When hinged cover 13 is moved against its spring bias and placed in closed relation to housing 11, latch 15 passes through aperture 17 in housing 11 and engages a cover-locking mechanism which shall be discussed in greater detail below. Back release stud 19, which protrudes through a suitable aperture in the side of housing 11, is directly coupled to this cover-locking mechanism and, when back release stud 19 is pressed in an upward direction by the operator, latch 15 is released by the cover-locking mechanism permitting cover 13 to swing open under the influence of its spring bias.

To load film in the camera, the operator places a spool of unexposed film in film supply recess 21 and then feeds the film across the back of the camera and past the camera's picture-taking axis, threading the film leader through slot 22 of a film take-up spool 23 which is positioned in take-up recess 25. (It should be noted that while the following description is based upon separate roll film of the type just described, the invention herein applies with equal facility to a cassette loading camera in which the film take-up portion of the cassette is designed to fit into film take-up recess 25 to be engaged by the film-winding mechanism of the camera.) Following the threading of the leader, camera cover 13 is closed and the film is advanced by means of winding lever 27. Following each metered advancement of the film, exposures are made when the operator presses down on the shutter release bar 29.

Automatic Engagement of Take-up Spool

After film is initially loaded in the camera, and following each exposure, the operator moves spring-biased winding lever 27 horizontally along slot 31 toward the front of the camera and then allows winding lever 27 to be returned to its original position (as illustrated in FIG. 1) by its spring bias. This reciprocating movement of winding lever 27 imparts unidirectional rotation to film-winding spool 23, advancing the film, and the operator repeats this winding lever motion until the forward motion of winding lever 27 is blocked by a metering device, e.g., a device which senses a slot in the unexposed film indicating that the film has been advanced sufficiently to permit another exposure to be made. While such metering devices are well known in the art and requires no explicit disclosure herein, the remaining parts of the winding mechanism will now be described in detail.

FIG. 2 shows the basic parts of the winding mechanism disclosed herein in exploded view. (Reference may also be made during the following description to FIGS. 3 and 7 in which certain of the parts of the winding mechanism are shown in their various working relationships.) Winding lever 27, which is attached to the camera's mounting plate 33 by means of a pivot 35, is provided with cogs 37 which in turn engage the co-operating cogs of a pinion or driving gear 39. Clutch face 41 of metering wheel 43 co-operates with spring pawl 45 to provide a clutch mechanism which is connected to driving gear 39 by means of keys 47 and slots 49. Braking spring arm 51 of dual-purpose spring 53 presses against the outer circumference of metering wheel 43 to provide sufficient frictional force to prevent the backing-up of metering wheel 43 at such times when spring pawl 45 is being rotated in a clockwise or non-driving direction, such rotation occurring when winding lever 27 is being restored to its initial position by the action of return spring 55 following each winding movement by the camera operator.

The reciprocating movement of winding lever 27 is translated by the clutch mechanism just described to provide the necessary uni-directional rotation required to wind film on take-up spool 23, the latter being coupled to the drive mechanism through flexible drive link 57 and spool coupler 59. Flexible drive link 57 is keyed to metering wheel 43 by lugs 61, while leaf-spring sections 63 co-operate with ratchet lugs 65 on the top face of spool coupler 59. The bottom face of coupler 59 carries spool-engaging lugs 67 which are designed to engage suitable ribs 69 formed in the end of the film take-up spool.

It can be seen (FIG. 3) that the upper portion of this winding mechanism is supported by mounting plate 33, while the lower portion of the mechanism, namely, the flexible drive link 57 and spool coupling member 59, is maintained in position by means of support collar 71 of elevator 73. It is the co-operation of elevator 73 and flexible drive link 57 that comprises one of the unique features of the invention disclosed herein.

Figure 3:
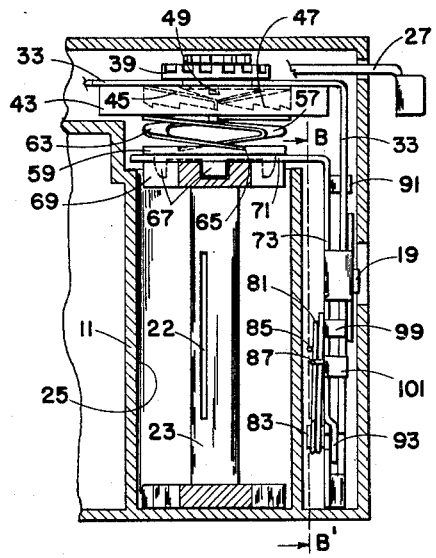
FIG. 3 is a partial cross-section of the camera illustrated in FIG. 1 taken along the plane A and viewed in the direction of the arrows, showing only those parts pertinent to the disclosure herein in their relative positions when the camera cover is closed and locked and the winding mechanism is engaged with the film-winding spool.

As illustrated in FIGS. 3 and 4, when cover 13 of the camera is closed, elevator 73 is in a lowered position permitting leaf-spring sections 63 to distend (see FIG. 3) and allowing spool coupler 59 to engage film take-up spool 23 in the manner just described. When in this lowered position, elevator 73 also locks cover 13 in closed relation to camera housing 11.

The cover locking is provided for as follows: Spring 81, which is wrapped around lug 83 of mounting plate 33, has one end trapped by lug 85 of mounting plate 33 and the other end trapped by lug 87 of elevator 73, and imparts a downward influence on elevator 73. An arm 91 and a leg 93 of elevator 73 co-operate with suitably formed sections of mounting plate 33 to hold elevator 73 in slideable relation to mounting plate 33 at all times. While the downward influence of spring 81 holds elevator 73 in the position shown, spring 81 also imparts a lateral force to elevator 73, but this force is overcome by the blocking effect of toe 95 of elevator 73 co-operating with the lateral edge of protruding notch 97 of mounting plate 33. In this position, locking stud 99 of elevator 73 engages latch 15 of cover 13 (shown in FIG. 4 but omitted in FIG. 3), locking cover 13 in closed relation to housing 11.

After the entire roll of film has been exposed, and the film completely wound on film take-up spool 23, the camera operator opens cover 13 of the camera by pressing back release stud 19 in an upward direction. This moves the entire elevator mechanism in an upward direction, and locking stud 99 is moved out of engagement with latch 15 of cover 13, permitting the latter to spring open under the influence of its spring bias. At the same time, blocking toe 95 of elevator 73 clears the lateral edge of protruding notch 97 of mounting plate 33, and spring 81 acting on lug 87 then forces the bottom portion of elevator 73 in a lateral direction causing blocking toe 95 to ride on the upper edge of protruding notch 97 (see FIGS. 5 and 6), and this now prevents the downward force of spring 81 from moving elevator 73 back to its spring-biased, lowered position.

The raising of elevator 73 raises its supporting collar 71, causing spool coupler 59 to disengage lugs 67 from ribs 69 of take-up spool 23, thereby freeing take-up spool 23 and permitting its removal from the camera. Attention is called to the fact that this motion of spool coupling member 59 is not imparted to the entire winding mechanism but instead is completely absorbed by the contraction of left-spring sections 63 of flexible drive link 57, the remaining portions of the winding mechanism being maintained in their normal relation (see FIG. 5).

When the camera has been reloaded and the film leader from the new spool of unexposed film has been threaded through slot 22 of a new film take-up spool 23 which is placed in take-up recess 25 of camera housing 11, the camera operator presses cover 13 of the camera into closed relation with housing 11. As was just explained above, when the camera cover is open, elevator 73 and the film-winding mechanism is in the position as illustrated in FIGS. 5 and 6. As the cover 13 is closed, the leading portion of latch 15 presses against closing stud 101 of elevator 73, forcing the lower portion of elevator 73 to move laterally against the influence of spring 81. As soon as blocking toe 95 of elevator 73 has been moved clear of the upper edge of protruding notch 97, the downward force of spring 81 against lug 87 moves the entire elevator 73 in a downward direction. This again locks the leading portion of blocking toe 95 against the lateral edge of protruding notch 97 (FIGS. 3 and 4) and prevents the lateral motion of elevator 73 in response to spring 81. At the same time this downward motion of elevator 73 causes locking stud 99 to move behind latch 15, thereby locking cover 13 in closed relation to camera housing 11.

Shutter-Cocking Control Mechanism

Figure 7:
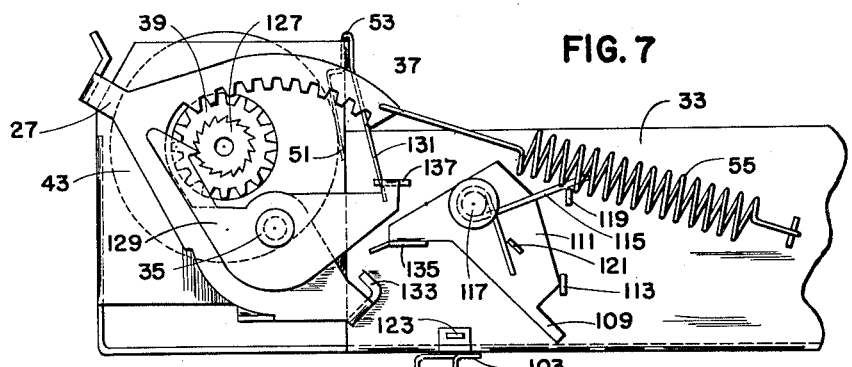

The shutter-cocking control feature of the disclosed winding mechanism will be described with reference to FIGS. 7 through 10 which illustrate a specific embodiment of the mechanism as adapted for use with a camera employing an impact-type shutter 103 shown in covering relation to the camera's picturetaking axis. The motion of shutter 103 is initiated in the manner well known in the art by the striking of protruding shutter lug 107 by finger 109 of shutter-striking plate 111 as the striking plate 111 moves from its cocked position (FIG. 10) to its normal at-rest position (FIG. 7). When at rest, striking plate 111 is held against stop 113 on mounting plate 33 by the bias of spring 115 which is looped around stud 117 and has one end anchored by pin 119 of mounting plate 33 and the other end secured by lug 121 of shutter-striking plate 111. It its cocked position, shutter-striking plate 111 is maintained against the tension of spring 115 by shutter latch 123 which is directly connected to shutter release bar 29 (FIG. 1) and releases striking plate 111 whenever the camera operator depresses shutter release bar 29.

Rigidly affixed to the winding mechanism driving gear 39 and concentric therewith is a ratchet wheel 127 which is normally engaged by the head of pawl 129, which rotates about pivot 35. The head of pawl 129 is normally held in engagement with the teeth of ratchet wheel 127 by action of pawl control spring arm 131 of spring 53. When engaged in this fashion, pinion 129 prevents the clockwise rotation of the entire winding mechanism.

Figure 8:
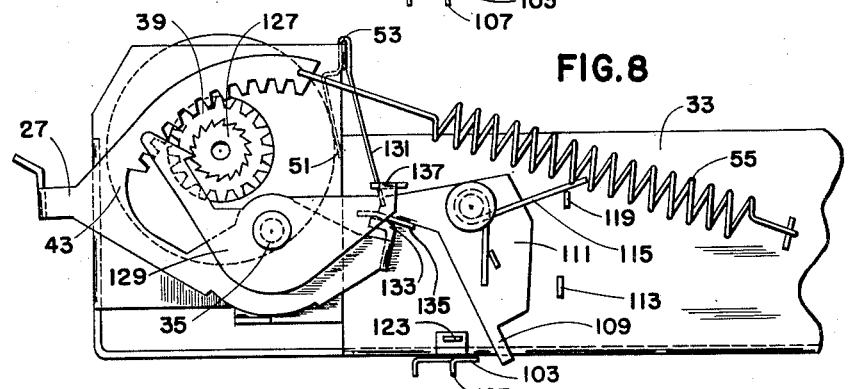
Figure 9:
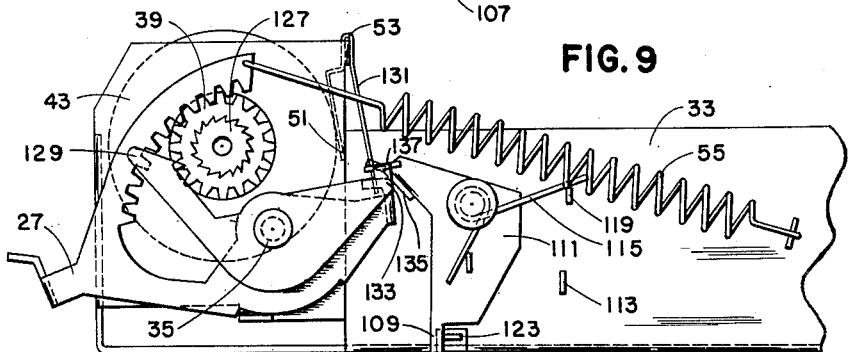
Figure 10:
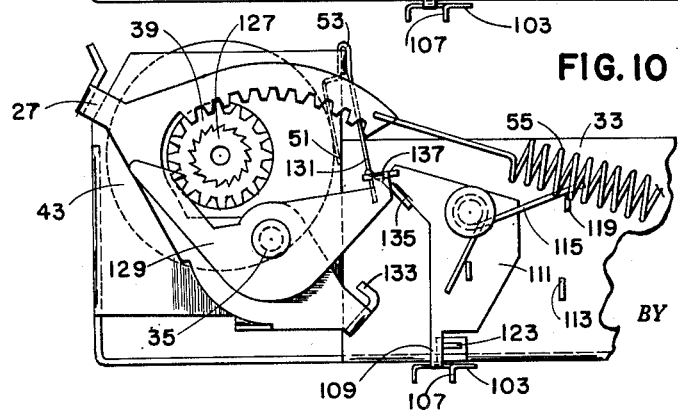

When the camera operator initially begins to wind the film following an exposure, he moves winding lever 27 along slot 31 toward the front of the camera (FIG. 1), thereby imparting counter-clockwise rotational movement to the winding mechanism by virtue of the motion of winding lever cogs 37 acting in cooperation with the corresponding cogs of driving gear 39. As winding lever 27 is moved in a counter-clockwise direction, its foot 133 comes in contact with lip 135 of shutter-striking plate 111, causing shutter-striking plate 111 to move in a clockwise direction against the force of spring 115. So long as winding lever 27 is moved in a complete stroke, as illustrated in FIGS. 7 through 9, shutter-striking plate 111 will be rotated clockwise until its finger 109 is trapped by shutter latch 123, thereby cocking the camera's shutter mechanism.

However, as was mentioned above, the simple, inexpensive, ratchet-type clutch mechanism utilized in this winding mechanism could normally permit the camera operator to move winding lever 27 in small arcs (which would wind the film until the next metered segment of unexposed film was reached) without ever necessitating the movement of winding lever 27 through an arc sufficient to cock shutter-striking plate 111. To prevent this undesirable possibility, the invention herein provides ratchet wheel 127 and pawl 129, which prevent the clockwise rotation of winding lever 27 until such time as shutter-striking plate 111 has reached its cocked position. This shutter-cocking control is provided as follows: As shutter-striking plate 111 is moved into its cocked position by action of the foot 133 of winding lever 27 on lip 135 (FIG. 8), lip 135 of shutter-striking plate 111 in turn contacts ear 137 of pawl 129, moving the head of pawl 129 out of contact with ratchet wheel 127 against the influence of pawl control spring arm 131 of spring 54 (FIG. 9). Thus, once winding lever 27 has been moved through a sufficient arc to cock shutter-striking plate 111, pawl 129 is moved and held out of contact with ratchet wheel 127 by lip 135 of striking plate 111, and pawl 129 remains out of contact with ratchet wheel 127 until such, time as the camera operator depresses shutter-release bar 29, thereby releasing shutter-striking plate 111. This permits finger 109 of shutter-striking plate 115 to strike protruding lug 107 of impact shutter 103, resulting in an exposure in the manner well known in the art. The shutter actuating motion of striking plate 111 causes lip 135 to release ear 137 and permits pawl control spring arm 131 to rotate the head of pawl 129 in a clockwise direction until it reestablishes contact with ratchet wheel 127, thereby once again assuring that shutter-striking plate 111 will be cocked prior to the completion of the next metered film advance.

It should be noted that once winding lever 27 has been moved through a large enough arc to fully cock shutter-striking plate 111, the removal of pawl 129 from ratchet wheel 127 permits the operator to move winding lever 27 (FIG. 10) in either small or large arcs until such time as the metering device (not shown) locks the camera's winding mechanism indicating that sufficient film has been wound to permit the taking of another exposure.

Having described one specific embodiment of the present invention, it is desired that it be understood that this form is selected to facilitate in the disclosure of the invention rather than to limit the number of forms which it may assume; and, it is to be further understood that various modifications, adaptations, and alterations may be applied to the specific form shown to meet the requirements of practice, without in any manner departing from the spirit or scope of the present invention.

What is claimed is:

1. In a roll film camera adapted to accommodate a rotatable film winding member, and having:
   (a) a housing,
   (b) a cover movable into and out of closed relation to said housing,
   (c) locking means movable between
      (1) a first position locking said cover in said closed relation, and
      (2) a second position in which said cover is released for movement out of said closed relation,
      (3) said locking means being resiliently biased toward said first position,
   (d) lock control means for holding said locking means in said second position against the influence of said resilient bias so long as said cover is out of closed relation with said housing,
   (e) a driving member rotatable in a first and a second direction around an axis and immobile in an axial direction,
   (f) a coupling member movable between
      (1) an engaged position for engagement with said rotatable winding member when said member is accommodated in said camera, and
      (2) a disengaged position out of engagement with said rotatable winding member,
   (g) a spring-loaded shutter driving mechanism movable between a cocked position and a released position,
   (h) shutter cocking means responsive to the rotation of said driving member in said first direction for moving said shutter driving mechanism to said cocked position, the improvement comprising:
   (i) a flexible drive-link drivingly engaged to said coupling member and having a contracted posture and a distended posture,
   (j) a clutch mechanism connecting said driving member and said flexible drive link for imparting rotational movement to said flexible drive link only when said driving member is rotated in said first direction,
   (k) said coupling member being responsive to said locking means
      (1) for movement to said disengaged position causing said flexible drive link to assume its said contracted posture when said locking means is in said second position and said cover is open, and
      (2) for movement to said engaged position causing said flexible drive link to assume its said distended posture when said locking means has been moved to said first position by said resilient bias in response to the closing of said cover, and
   (l) blocking means responsive to the position of said shutter driving mechanism
      (1) for preventing the rotation of said driving member in said second direction so long as said shutter driving mechanism is not in said cocked position, and (2) for releasing said driving member for movement in both directions when said shutter driving mechanism is in said cocked position.

2. A camera according to claim 1 wherein said flexible drive link includes spring means for biasing said coupling member towards said engaged position and for maintaining contact between said driving member and said coupling member at all positions of said coupling member.

3. A camera according to claim 1 wherein said blocking means includes:

(a) ratchet wheel rigidly affixed to said driving member, (b) a spring, (c) a pawl biased by said spring to engage said ratchet wheel, (d) said pawl being driven out of engagement with said ratchet wheel against the influence of said spring by said shutter driving mechanism when said shutter driving mechanism is in said cocked position.

References Cited in the file of this patent
UNITED STATES PATENTS

| | | |
|---|---|---|
| 1,713,503 | Von Madaler | May 14, 1929 |
| 2,581,691 | Moomaw et al. | Jan. 8, 1952 |
| 3,021,773 | Hintze et al. | Feb. 20, 1962 |